United States Patent
Igarashi et al.

(10) Patent No.: US 7,352,750 B2
(45) Date of Patent: Apr. 1, 2008

(54) MOBILE TERMINAL, CONTROL DEVICE AND MOBILE COMMUNICATION METHOD

(75) Inventors: Ken Igarashi, Yokohama (JP); Satoshi Hiyama, Yokohama (JP); Yuki Moritani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 216 days.

(21) Appl. No.: 11/249,329

(22) Filed: Oct. 14, 2005

(65) Prior Publication Data

US 2006/0083243 A1    Apr. 20, 2006

(30) Foreign Application Priority Data

Oct. 15, 2004    (JP) .......................... P2004-302259

(51) Int. Cl.
*H04L 12/28* (2006.01)
(52) U.S. Cl. ..................... 370/392; 455/445; 455/552.1
(58) Field of Classification Search ................ 370/237, 370/238, 338, 351; 455/11.1, 426.1, 445, 455/552.1, 553.1
See application file for complete search history.

(56) References Cited

U.S. PATENT DOCUMENTS

| 2003/0076852 A1 | 4/2003 | Fukui |
| 2004/0147223 A1* | 7/2004 | Cho .......................... 455/41.2 |
| 2006/0040670 A1 | 2/2006 | Ll et al. |

FOREIGN PATENT DOCUMENTS

| EP | 1 398 910 A1 | 3/2004 |
| WO | WO 01/11833 A1 | 2/2001 |
| WO | WO 2004/034642 A1 | 4/2004 |

OTHER PUBLICATIONS

C. Perkins, et al., "Ad hoc On-Demand Distance Vector (AODV) Routing", Network Working Group C., Nokia Research Center, rfc3561, Jul. 2003, pp. 1-55.
David B. Johnson, et al., "The Dynamic Source Routing Protocol for Mobile Ad Hoc Networks (DSR)", IETF MANET Working Group, draft-ietf-manet-dsr-10, Jul. 19, 2004, pp. 1-173.
Hui Ll, et al., "Comparison of Ad Hoc and Centralized Multihop Routing", Wireless Personal Multimedia Communications, vol. 2, XP-010619198, Oct. 27, 2002, pp. 791-795.

* cited by examiner

*Primary Examiner*—Lee Nguyen
(74) *Attorney, Agent, or Firm*—Oblon, Spivak, McClelland, Maier & Neustadt, P.C.

(57) ABSTRACT

A mobile terminal includes; a first wireless interface configured to perform communication through a public mobile communication network; a second wireless interface configured to perform direct communication with another mobile terminal; an update information transmitter unit configured to transmit update information including identification information and communication state information of the mobile terminal, to a control device in the public mobile communication network through the first wireless interface at a predetermined timing; a route maintaining unit configured to receive a packet transfer route generated by the control device of the public mobile communication network based on the update information through the first wireless interface, and to maintain the packet transfer route; and a packet transmitter unit configured to transmit a packet to another mobile terminal through the second wireless interface based on the packet transfer route.

14 Claims, 16 Drawing Sheets

FIG. 4

MOVING SPEED
4: FAST 2: SLOW 0: STATIONARY

AMOUNT OF BATTERY REMAINING
3: LITTLE 2: NORMAL 1: MUCH

MOVING RECORD
5: LARGE 3: MEDIUM 1: SMALL (a) ROUTE 1

|  | MT1 | MT2 | MT4 | MT5 |
|---|---|---|---|---|
| MOVING SPEED | 2 | 4 | 3 | 0 |
| AMOUNT OF BATTERY REMAINING | 2 | 1 | 3 | 3 |
| MOVING RECORD | 3 | 3 | 5 | 1 |

(b) ROUTE 2

|  | MT1 | MT3 | MT4 | MT5 |
|---|---|---|---|---|
| MOVING SPEED | 2 | 2 | 3 | 0 |
| AMOUNT OF BATTERY REMAINING | 2 | 2 | 3 | 3 |
| MOVING RECORD | 3 | 1 | 5 | 1 |

(c) ROUTE 3

|  | MT1 | MT3 | MT5 |
|---|---|---|---|
| MOVING SPEED | 2 | 2 | 0 |
| AMOUNT OF BATTERY REMAINING | 2 | 2 | 3 |
| MOVING RECORD | 3 | 1 | 1 |

MOBILE TERMINAL, CONTROL DEVICE AND MOBILE COMMUNICATION METHOD

CROSS REFERENCE TO RELATED APPLICATION

This application is based upon and claims the benefit of priority from the prior Japanese Patent Application No. P2004-302259, filed on Oct. 15, 2004; the entire contents of which are incorporated herein by reference.

BACKGROUND OF THE INVENTION

1. Field of the Invention

The present invention relates to a mobile terminal, a control device and a mobile communication method. In particular, the present invention relates to a mobile communication method in which a public land mobile network (PLMN) operates in cooperation with an ad hoc network, and to a mobile terminal and a control device used in the mobile communication method.

2. Description of the Related Art

In recent years, a method of performing communication by use of direct communication between mobile terminals has been discussed in the "Mobile Ad-hoc Networks (Manet) working group" of the Internet Engineering Task Force (IETF).

As representative routing protocols in such a method, "the Ad hoc On-Demand Distance Vector (AODV) routing", "the Dynamic Source Routing Protocol for Mobile Ad hoc Networks (DSR)" and the like are proposed.

Setting a path and transferring a packet are performed by exchanging messages by use of direct communication between mobile terminals in the Manet-related routing protocols.

In this manner, the Manet has an advantage to be capable of communication without requiring a large-scale infrastructure such as a base station or a core network in the public land mobile network.

However, the Manet requires recalculating a packet transfer route from an originating terminal to a destination terminal in cases such as when a mobile terminal is to be a relay point for the packet transfer has moved. Therefore, the Manet requires exchanging messages again by use of direct communication between mobile terminals, and thus there has been a problem for the Manet to have a large amount of traffic in the direct communication between mobile terminals for the maintenance of the packet transfer route.

BRIEF SUMMARY OF THE INVENTION

The present invention has been made considering the problems, and its object is to provide a mobile terminal, a control device and a mobile communication method, three of which can control the traffic amount necessary to calculate a packet transfer route in communication using direct communication between mobile terminals.

A first aspect of the present invention is summarized as a mobile terminal including: a first wireless interface configured to perform communication through a public mobile communication network; a second wireless interface configured to perform direct communication with another mobile terminal; an update information transmitter unit configured to transmit update information including identification information and communication state information of the mobile terminal, to a control device in the public mobile communication network through the first wireless interface at a predetermined timing; a route maintaining unit configured to receive a packet transfer route generated by the control device of the public mobile communication network based on the update information through the first wireless interface, and to maintain the packet transfer route; and a packet transmitter unit configured to transmit a packet to another mobile terminal through the second wireless interface based on the packet transfer route.

In the first aspect, the communication state information can include at least one of an amount of battery remaining of the mobile terminal, a moving speed of the mobile terminal, and a moving frequency of the mobile terminal, and the update information transmitter unit can be configured to decrease a transmission frequency of the update information in any one of cases where the amount of battery remaining of the mobile terminal is equal to or less than a predetermined amount, where the moving speed of the mobile terminal is equal to or faster than a predetermined speed, and where the moving frequency of the mobile terminal is equal to or more than a predetermined frequency.

In the first aspect, the update information transmitter unit can be configured to collect the update information of other mobile terminals, and to transmit the collected update information together with the update information of the mobile terminal to the control device of the public mobile communication network when the mobile terminal is determined to be a representative terminal by the control device in the public mobile communication network.

In the first aspect, the mobile terminal can further include a path state monitoring unit configured to monitor a state of a path established between the mobile terminal and another mobile terminal, and the packet transmitter unit can be configured to transmit the packet to the public mobile communication network through the first wireless interface, when the path established between the mobile terminal and another mobile terminal has been disconnected.

In the first aspect, the mobile terminal further can include; an arrival monitoring unit configured to monitor whether or not the packet transmitted through the second wireless interface arrives at any one of a destination terminal and a relay mobile terminal; and a route change command transmitter unit configured to transmit a route change command to command to change the packet transfer route, to the control device in the public mobile communication network through the first wireless interface, when the packet is detected not to arrive at any one of the destination terminal and the relay mobile terminal within a predetermined period of time.

A second aspect of the present invention is summarized as a control device provided in a public mobile communication network, including: an update information manager unit configured to receive and manage update information including identification information and communication state information of a mobile terminal from the mobile terminal at a predetermined timing; a route calculator unit configured to calculate an optimum packet transfer route out of a plurality of packet transfer routes from the mobile terminal to a destination terminal based on the communication state information; and a notification unit configured to notify the mobile terminal of the calculated packet transfer route.

In the second aspect, the control device can further include: a determining unit configured to determine a representative terminal which transmits the update information of the plurality of mobile terminals as a representative to the control device based on the communication state information; and a notification unit configured to notify the determined representative terminal of the fact to that effect.

In the second aspect, the control device can further include a congestion monitoring unit configured to monitor a congestion state of an access node provided in the public mobile communication network, and the route calculator unit can be configured to change the packet transfer route from the mobile terminal to the destination terminal, so as not to pass through the access node in which the congestion state has been detected.

In the second aspect, the route calculator unit can be configured to change the packet transfer route from the mobile terminal to the destination terminal, when being notified by the mobile terminal that a path established between the mobile terminal and another mobile terminal has been disconnected.

In the second aspect, the route calculator unit can be configured to change the packet transfer route from the mobile terminal to the destination terminal, when being notified by the mobile terminal that a packet has not arrived at any one of the destination terminal and a relay mobile terminal within a predetermined period of time, A third aspect of the present invention is summarized as a mobile communication method including: transmitting, at a mobile terminal, a update information including identification information and communication state information of the mobile terminal, to a control device in a public mobile communication network through a first wireless interface at a predetermined timing; calculating, at the control device, an optimum packet transfer route out of a plurality of packet transfer routes from the mobile terminal to a destination terminal based on the communication state information included in the received update information; notifying, at the control device, the mobile terminal of the calculated packet transfer route; and transmitting, at the mobile terminal, a packet to another mobile terminal through a second wireless interface based on the packet transfer route.

In the third aspect, the mobile communication method can further include: determining, at the control device, a representative terminal which transmits the update information of the plurality of mobile terminals as a representative to the control device based on the communication state information; notifying, at the control device, the determined representative terminal of the fact to have been determined as the representative terminal; and collecting, at the mobile terminal, the update information of other mobile terminals, and transmitting, at the mobile terminal, the collected update information together with the update information of the mobile terminal, to the control device, when the fact to have been determined as the representative terminal has been notified.

In the third aspect, the mobile communication method can further include: monitoring, at the control device, a congestion state of an access node provided in the public mobile communication network; and changing, at the control device, the packet transfer route from the mobile terminal to the destination route, so as not to pass through the access node in which the congestion state has been detected.

BRIEF DESCRIPTION OF THE SEVERAL VIEWS OF THE DRAWINGS

FIGS. 4(a) to 4(c) are views for explaining a method of determining a packet transfer route in the control device according to the first embodiment of the present invention.

DETAILED DESCRIPTION OF THE INVENTION (Configuration of Mobile Communication System According to First Embodiment of the Present Invention)

Figure 1:
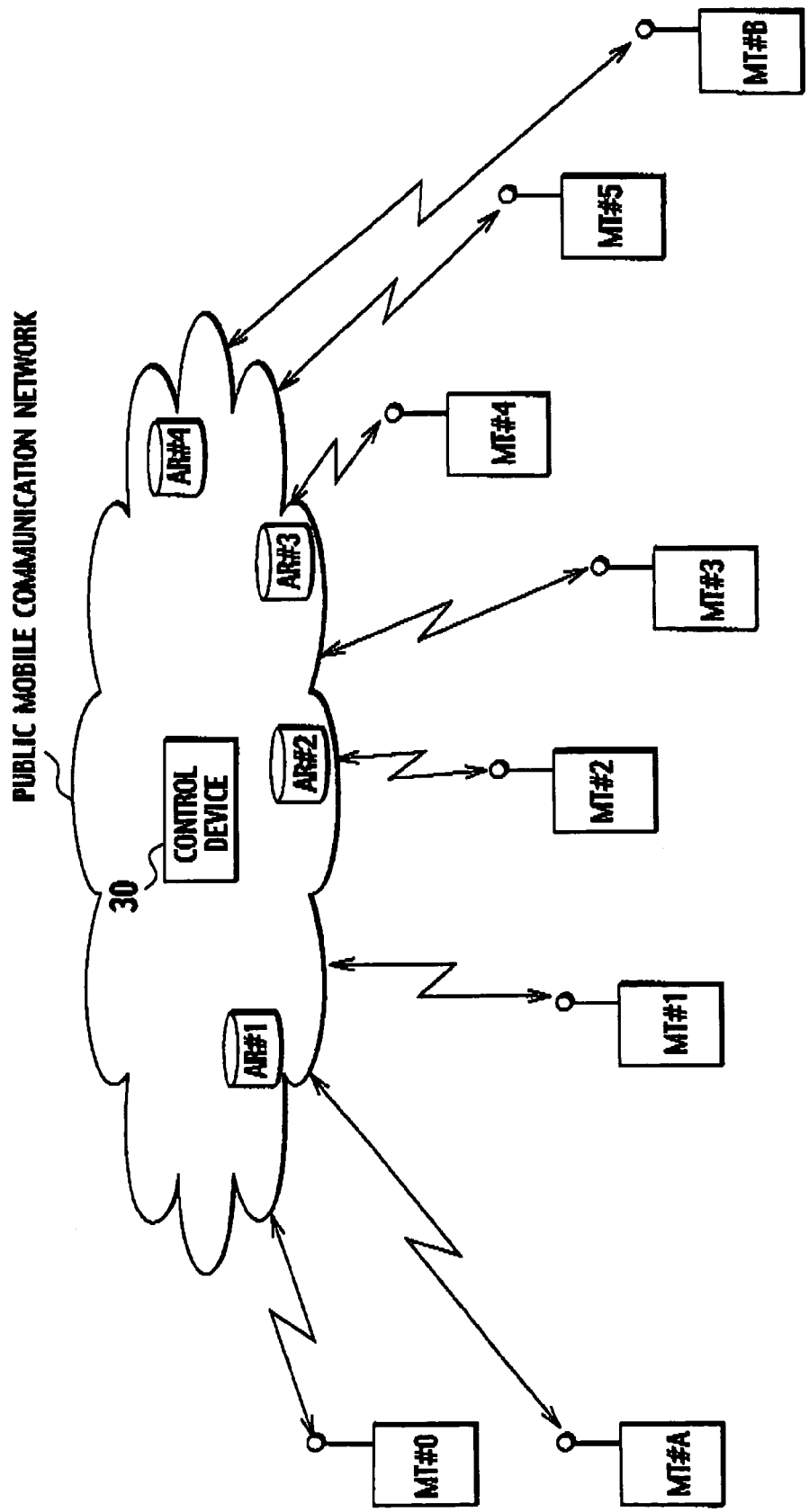
FIG. 1 is an entire configuration diagram of a mobile communication system according to first to fourth embodiments of the present invention.
Figure 2:
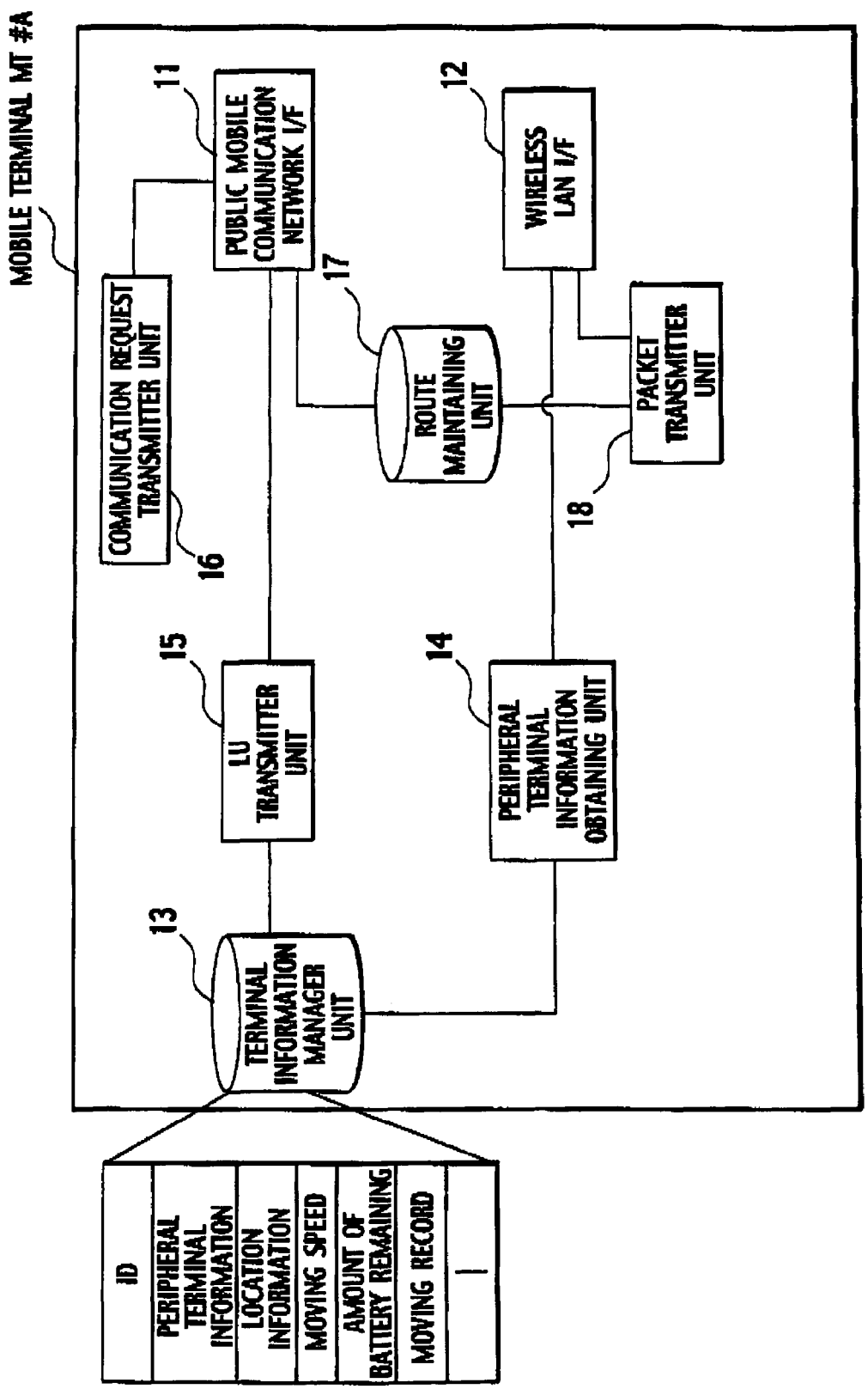
FIG. 2 is a functional block diagram of a mobile terminal according to the first embodiment of the present invention.
Figure 3:
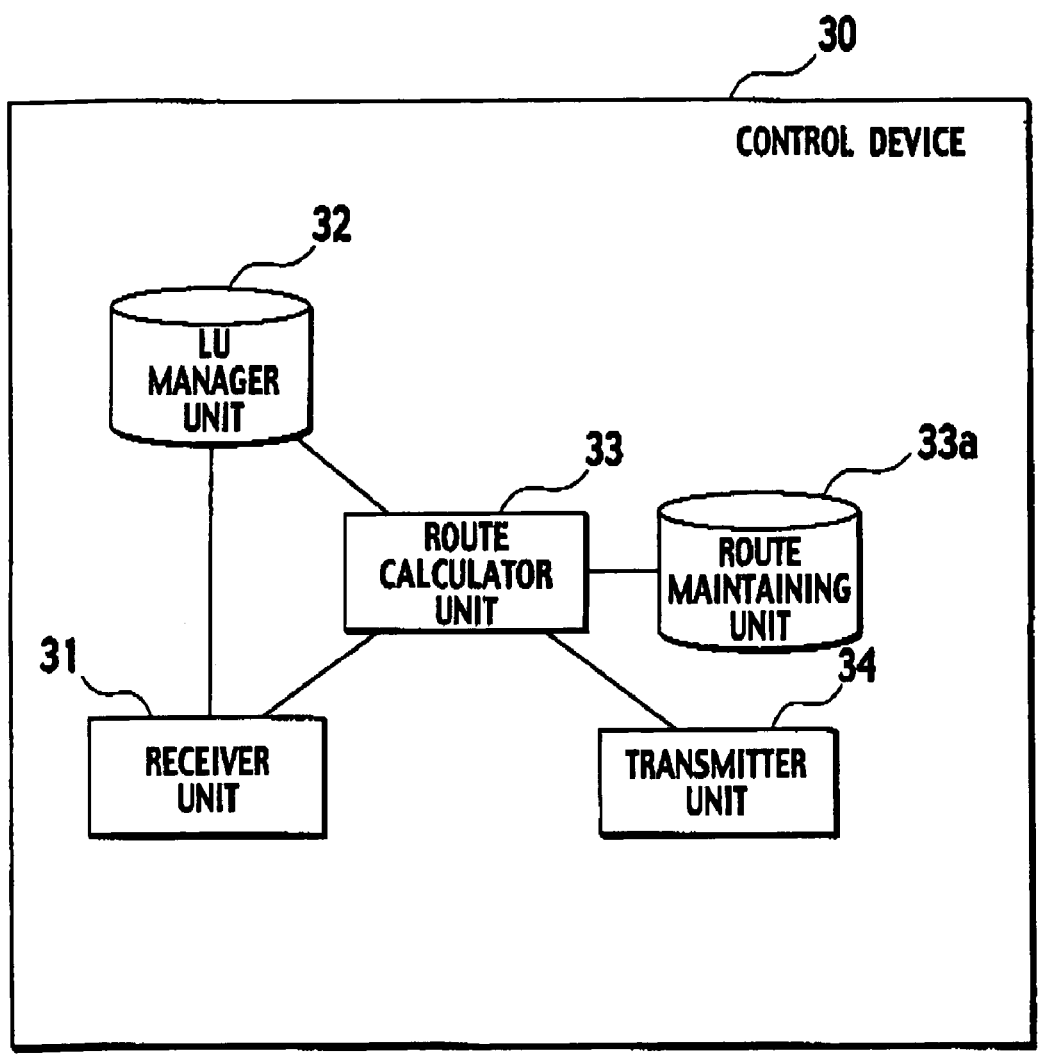
FIG. 3 is a functional block diagram of a control device according to the first embodiment of the present invention.

With reference to FIGS. 1 to 3, a description will be given of the configuration of a mobile communication system according to a first embodiment of the present invention. The mobile communication system according to this embodiment includes a plurality of mobile terminals MT #0 to MT #5, MT #A and MT #B, a control device 30 provided in a public land mobile network (PLMN) and a plurality of access nodes AR #1 to AR #4 as shown in FIG. 1.

The plurality of mobile terminals MT #0 to MT #5. MT #A and MT #B have basically the same function. Thus, a description will hereinafter be given of the mobile terminal MT #A.

As shown in FIG. 2, the mobile terminal MT #A according to this embodiment includes a public land mobile network I/F 11, a wireless LAN I/F 12, a terminal information manager unit 13, a peripheral terminal information obtaining unit 14, an LU transmitter unit 15, a communication request transmitter unit 16, a route maintaining unit 17 and a packet transmitter unit 18.

The public land mobile network I/F 11 is a first wireless interface configured to perform communication through the public land mobile network (i.e. public mobile communication network).

Specifically, the public land mobile network I/F 11 is configured with an interface of the "personal digital cellular telecommunication system (PDC)" or the "global system for mobile communications (GSM)" to be the second generation public mobile communication system, or an interface of the "international mobile telecommunications 2000 (IMT-2000)" to be the third generation public mobile communication system.

The wireless LAN I/F 12 is a second wireless interface configured to perform direct communication with another mobile terminal MT, Specifically, the wireless LAN I/F 12 is configured with an interface of a wireless LAN such as the "IEEE 802.11a/b/g", the "Bluetooth" or the "ZigBee".

The terminal information manager unit 13 is configured to store identification information (ID) of the mobile terminal MT #A and communication state information of the mobile terminal MT #A.

For example, the terminal information manager unit 13 is configured to store numbers which uniquely identify the mobile terminal MT #A, such as a subscriber number, as the identification information of the mobile terminal MT #A.

Furthermore, the terminal information manager unit 13 stores peripheral terminal information, location information, a moving speed, the amount of battery remaining, a moving record and the like, as the communication state information of the mobile terminal MT #A.

Here, the peripheral terminal information is information obtained by the peripheral terminal information obtaining unit 14, which includes the number of mobile terminals MT existing around the mobile terminal MT #A, the identification information of the mobile terminals MT and the like.

Moreover, the location information is information including latitude and longitude information obtained by GPS and the like, the identification information of the serving cell of the mobile terminal MT #A and the like.

In addition, the moving speed is information showing the moving speed of the mobile terminal MT #A obtained by an acceleration sensor and the like.

Further, the amount of battery remaining is information showing the amount of battery remaining of the mobile terminal MT #A.

Additionally, the moving record is information to be calculated based on a change in the location information and the like, which is information showing the frequency that the mobile terminal MT #A moves and information showing the distance that the mobile terminal MT #A moved within a predetermined period of time in the past.

The peripheral terminal information obtaining unit 14 is configured to obtain the above-mentioned peripheral terminal information through the wireless LAN I/F 12.

Specifically, the peripheral terminal information obtaining unit 14 can obtain the above-mentioned peripheral terminal information, by monitoring the communication of other mobile terminals MT.

Moreover, the peripheral terminal information obtaining unit 14 can obtain the above-mentioned peripheral terminal information by periodically transmitting advertisements including the identification information of the mobile terminal MT #A and using the reply.

For example, the peripheral terminal information obtaining unit 14 can obtain the above-mentioned peripheral terminal information by transmitting the "PING" to a broadcast address and using the reply.

The LU transmitter unit 15 is configured to transmit a location update (LU) (i.e. update information) including identification information and communication state information of the mobile terminal through the public land mobile network I/F (the first wireless interface) 11 to the control device 30 in the public land mobile network at a predetermined timing.

Note that the LU transmitter unit 15 may be configured to periodically transmit the location update to the control device 30.

Additionally, the LU transmitter unit 15 may be configured to transmit the location update again to the control device 30, when the mobile terminal MT #A made a move beyond the theoretically defined coverage area of the wireless LAN after the location update is transmitted. Such a move is intended to be detected by use of GPS and the like.

Furthermore, the LU transmitter unit 15 may be configured to decrease the frequency of transmitting the location update, when the amount of battery remaining of the mobile terminal MT #A is equal to or less than a predetermined amount, when the moving speed of the mobile terminal MT #A is equal to or more than a predetermined speed, or when a change in the location information of the mobile terminal MT #A satisfies predetermined conditions (for example, when the mobile terminal MT #A repeatedly moves at frequent intervals, or when the distance the mobile terminal MT #A moved within the predetermined period of time is longer than the predetermined distance).

As a result, when the packet transfer route is calculated, it is possible to reduce the number of the candidates of relay mobile terminals MT and to reduce the calculation load of a packet transfer route in the control device 30.

The communication request transmitter unit 16 is configured to transmit a communication request from the mobile terminal MT #A to a destination terminal, to the control device 30 through the public land mobile network I/F 11 in response to a command from a user.

The route maintaining unit 17 is configured to receive a packet transfer route generated by the control device 30 in the public land mobile network based on location updates, through the public land mobile network I/F 11, and to maintain the received packet transfer route.

The packet transmitter unit 18 is configured to transmit a packet to another mobile terminal (a mobile terminal existing in the surroundings) MT through the wireless LAN I/F 12, based on the packet transfer route maintained by the route maintaining unit 17.

The control device 30 according to this embodiment is configured to perform location information management and routing control regarding the plurality of mobile terminals MT.

As shown in FIG. 3, the control device 30 according to this embodiment includes a receiver unit 31, an LU manager unit 32, a route calculator unit 33, a route maintaining unit 33a and a transmitter unit 34.

The receiver unit 31 is configured to receive the location update (LU) including the identification information and communication state information of the mobile terminals MT, from the plurality of mobile terminals MT at a predetermined timing, and to transmit the received location update to the LU manager unit 32.

The LU manager unit 32 is configured to manage the location update received through the receiver unit 31. The LU manager unit 32 is configured to manage not only the latest location update but also the plurality of location updates received prior to that.

The route calculator unit 33 is configured to calculate an optimum packet transfer route out of the plurality of packet transfer routes from the mobile terminal to the destination terminal, based on the communication state information included in the location update.

With reference to FIG. 4, a description will be given of an example of a calculation method of the optimum packet transfer route by the route calculator unit 33 (the packet transfer route from the mobile terminal MT #A to the destination terminal MT #B in FIG. 1).

Firstly, the route calculator unit 33 calculates packet transfer routes (all packet transfer routes which satisfy the predetermined conditions) from the mobile terminal MT #A to the destination terminal MT #B, based on the location information of each mobile terminal MT managed by the LU manager unit 32 and the peripheral terminal information.

Secondly, when the plurality of packet transfer routes have been calculated, the route calculator unit 33 determines an optimum packet transfer route out of these packet transfer routes. With reference to FIGS. 4(a) to 4(c), a description will be given of an example of a method of determining such an optimum packet transfer route.

As shown in FIGS. 4(a) to 4(c), the route calculator unit 33 is assumed to calculate routes 1 to 3 as the packet transfer routes from the mobile terminal MT #A to the destination terminal MT #B.

Here, the route 1 indicates a packet transfer route "from the mobile terminal MT #A to the destination terminal MT #B through MT #1, MT #2, MT #4 and MT #5".

The route 2 indicates a packet transfer route "from the mobile terminal MT #A to the destination terminal MT #B through MT #1, MT #3, MT #4 and MT #5".

The route 3 indicates a packet transfer route "from the mobile terminal MT #A to the destination terminal MT #B through MT #1, MT #3 and MT #5".

Note that the route calculator unit 33 is configured to classify the above-mentioned communication state information into a predetermined number of levels, thus managing a cost corresponding to each level.

For example, as shown in FIGS. 4(a) to 4(c), the route calculator unit 33 is configured to classify the moving speed of each mobile terminal MT into three levels ("fast"/"slow"/ "stationary"). The cost corresponding to the moving speed level "fast" is "4", the cost corresponding to the moving speed level "slow" is "2", and the cost corresponding to the moving speed level "stationary" is "0".

Additionally, as shown in FIGS. 4(a) to 4(c), the route calculator unit 33 is configured to classify the amount of battery remaining of each mobile terminal MT into three levels ("little"/"normal"/"much"). The cost corresponding to the battery remaining amount level "little" is "3", the cost of the battery remaining amount level "normal" is "2", and the cost of the battery remaining amount level "much" is "1".

Moreover, as shown in FIGS. 4(a) to 4(c), the route calculator unit 33 is configured to classify the moving record of each mobile terminal MT into three levels ("large"/ "medium"/"small"). The cost corresponding to the moving record "large" is "5", the cost corresponding to the moving record level "medium" is "3", and the cost of the moving record level "small" is "1".

Incidentally, the mobile communication system can suitably change the cost corresponding to each level.

Next, the route calculator unit 33 is configured to calculate a total cost for each route, and to determine a route with the lowest total cost as the above-mentioned optimum packet transfer route.

In the examples of FIGS. 4(a) to 4(c), the total cost of the route 1 is "(2+4+3+0 (the moving speeds))+(2+1+3+3 (the amounts of battery remaining))+(3+3+5+1 (the moving records))=30".

The total cost of the route 2 is "(2+2+3+0 (the moving speed))+(2+2+3+3 (the amounts of battery remaining))+(3+ 1+5+1 (the moving records)=27".

The total cost of the route 3 is "(2+2+0 (the moving speeds))+(2+2+3 (the amounts of battery remaining))+(3+ 1+1 (the moving records))=14".

Consequently, the route 3 is determined as the optimum packet transfer route.

Note that the route calculator unit 33 may be configured to calculate the optimum packet transfer route out of the predetermined number of the routes, in which the relay mobile terminals MT are small in number, by use of the above-mentioned total cost calculation, when the number of the calculated packet transfer routes is large.

A route maintaining unit 33a is configured to maintain the optimum packet transfer route calculated by the route calculator unit 33 from each mobile terminal to the destination terminal.

Note that the route maintaining unit 33a can maintain a packet transfer route apart from the optimum packet transfer route, in order to switch the packet transfer routes swiftly, in cases such as when a failure in the used packet transfer route occurs.

The transmitter unit 34 is configured to notify a relevant mobile terminal MT of the packet transfer route calculated by the route calculator unit 33.

Moreover, the transmitter unit 34 may be configured to directly notify a transfer destination of a packet to the relay mobile terminal MT included on the packet transfer route.

(Operation of Mobile Communication System According to First Embodiment of the Present Invention)

Figure 5:
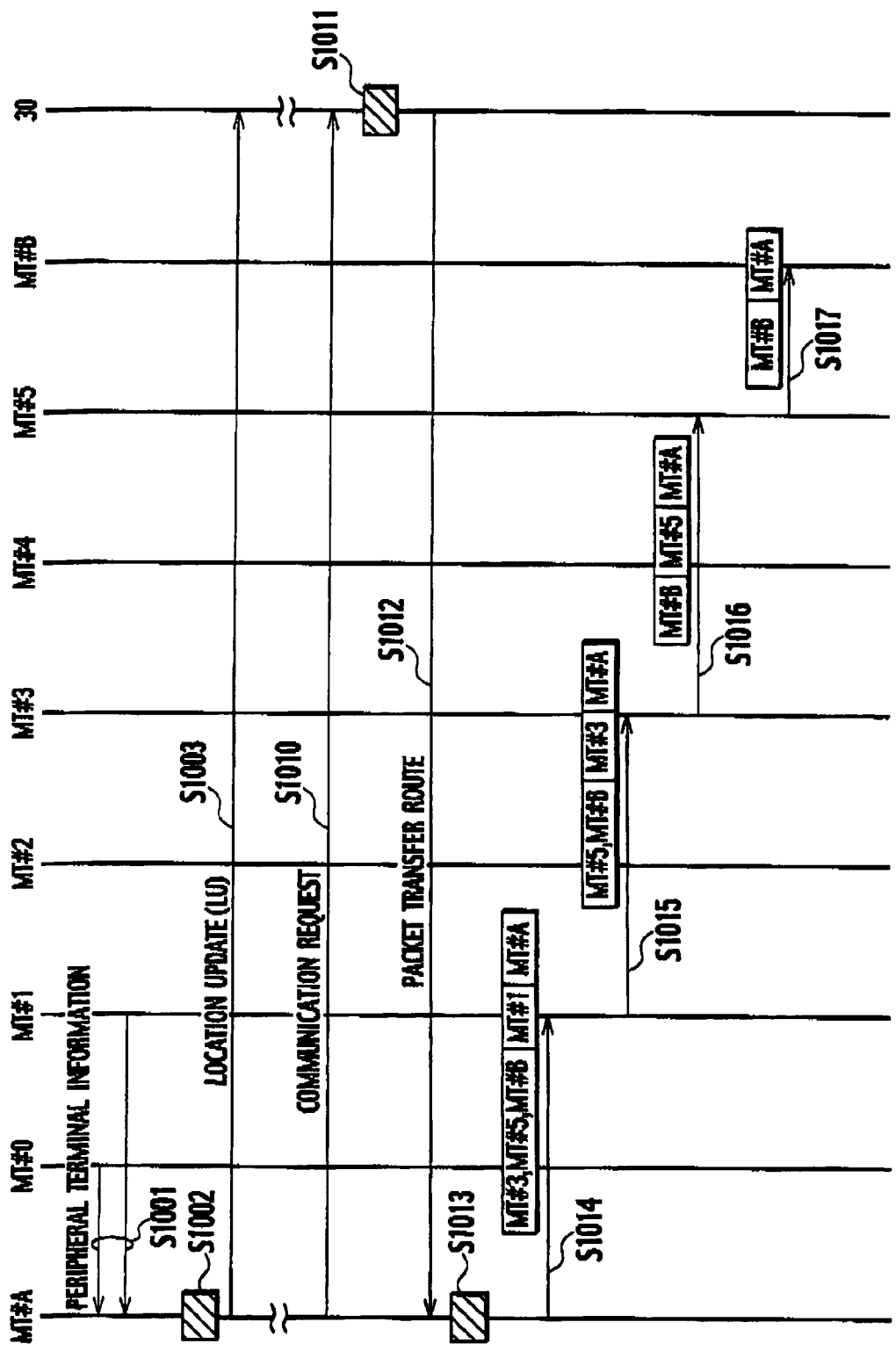
FIG. 5 is a sequence diagram showing a mobile communication method according to the first embodiment of the present invention.
Figure 6:
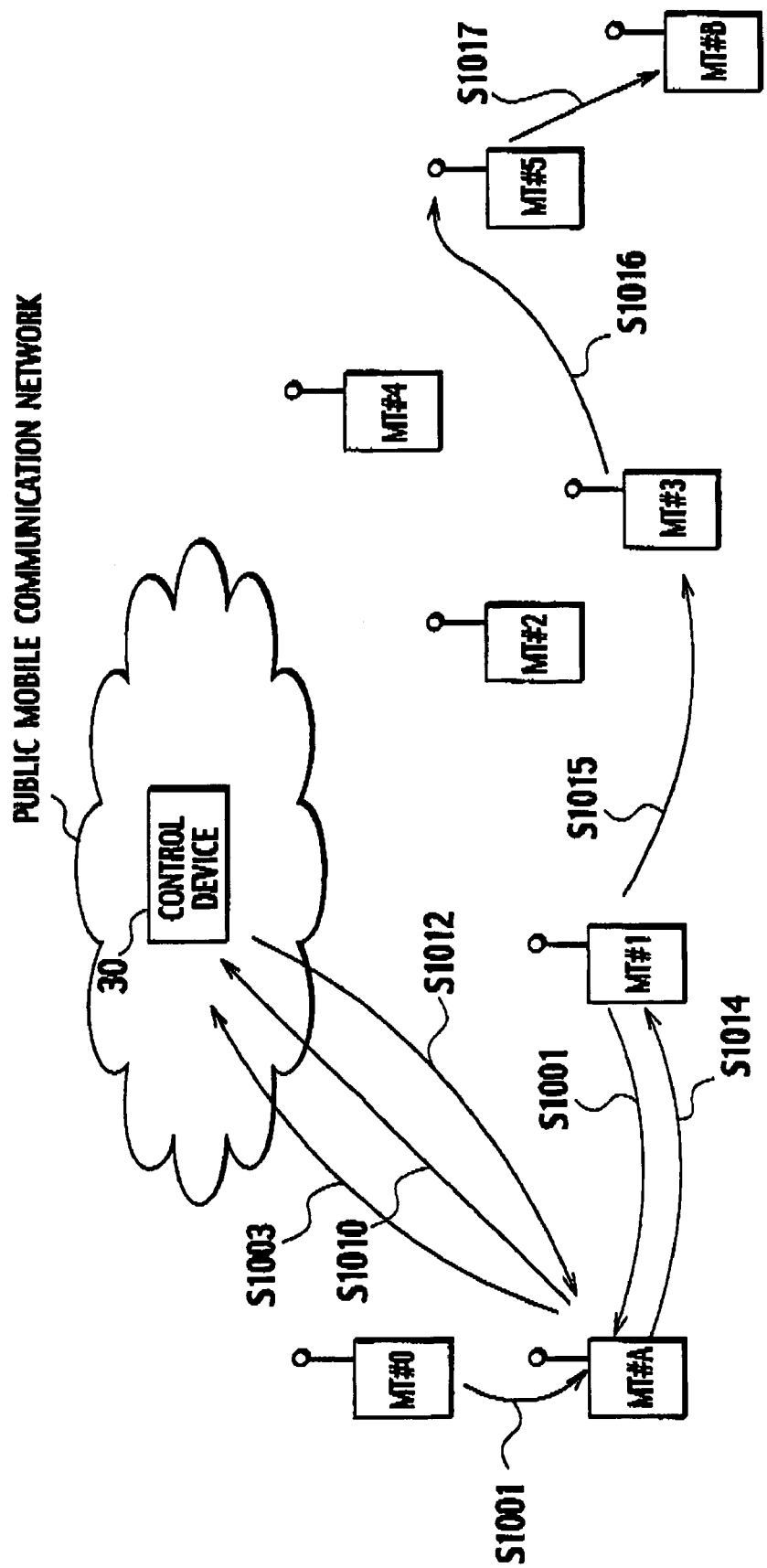
FIG. 6 is a view showing a flow of the mobile communication method according to the first embodiment of the present invention.

With reference to FIGS. 5 and 6, a description will be given of operation in which a packet is transferred from the mobile terminal MT #A to the destination terminal MT #B in the mobile communication system according to the first embodiment of the present invention.

As shown in FIGS. 5 and 6, in Step S1001, the peripheral terminal information obtaining unit 14 of the mobile terminal MT #A obtains the peripheral terminal information from the mobile terminals MT #0 and MT #1 existing around the mobile terminal MT #A.

In Step S1002, the LU transmitter unit 15 of the mobile terminal MT #A generates the location update (LU) including communication state information such as the received peripheral terminal information, location information, moving speed, amount of battery remaining and moving records, and the identification information of the mobile terminal MT #A.

In Step S1003, the generated location update is transmitted to the control device 30 in the public land mobile network, through the public land mobile network I/F 11.

In Step S1010, the communication request transmitter unit 16 of the mobile terminal MT #A transmits a communication request for starting communication with the mobile terminal MT #B through the public land mobile network I/F 11.

In Step S1011, the route calculator unit 33 of the control device 30 calculates the optimum packet transfer route from the mobile terminal MT #A to the destination terminal MT #B in response to the received communication request.

Here, the calculated packet transfer route is assumed to be "from the mobile terminal MT #A to the destination terminal MT #B through MT #1, MT #3 and MT #5" (the route 3 of the above-mentioned FIG. 4(c)).

In Step S1012, the transmitter unit 34 of the control device 30 notifies the mobile terminal MT #A of the calculated packet transfer route.

In Step S1013, the route maintaining unit 17 of the mobile terminal MT #A maintains the received packet transfer route.

In Step S1014, as in the case of the "DSR", the packet transmitter unit 18 of the mobile terminal #A transmits the packet to which a header where all relay mobile terminals included on the packet transfer route are designated is added, to the relay mobile terminal MT #1 through the wireless LAN I/F 12.

This packet is transferred to the destination terminal MT #B in Steps S1015 to S1017. Note that each relay mobile terminal MT may be configured to delete itself from the relay mobile terminals designated in the header of the received packet as shown in FIG. 5.

(Operation and Effects of Mobile Communication System According to First Embodiment of the Present Invention)

According to the mobile communication system according to the first embodiment of the present invention, it is possible to perform communication while controlling the traffic amount in direct communication between the mobile terminals MT relating to the calculation of the packet transfer route. This is because the packet transmitter unit 18 transmits the packet based on the packet transfer route calculated by the control device 30 in the public land mobile network.

FIRST MODIFICATION EXAMPLE

Figure 7:
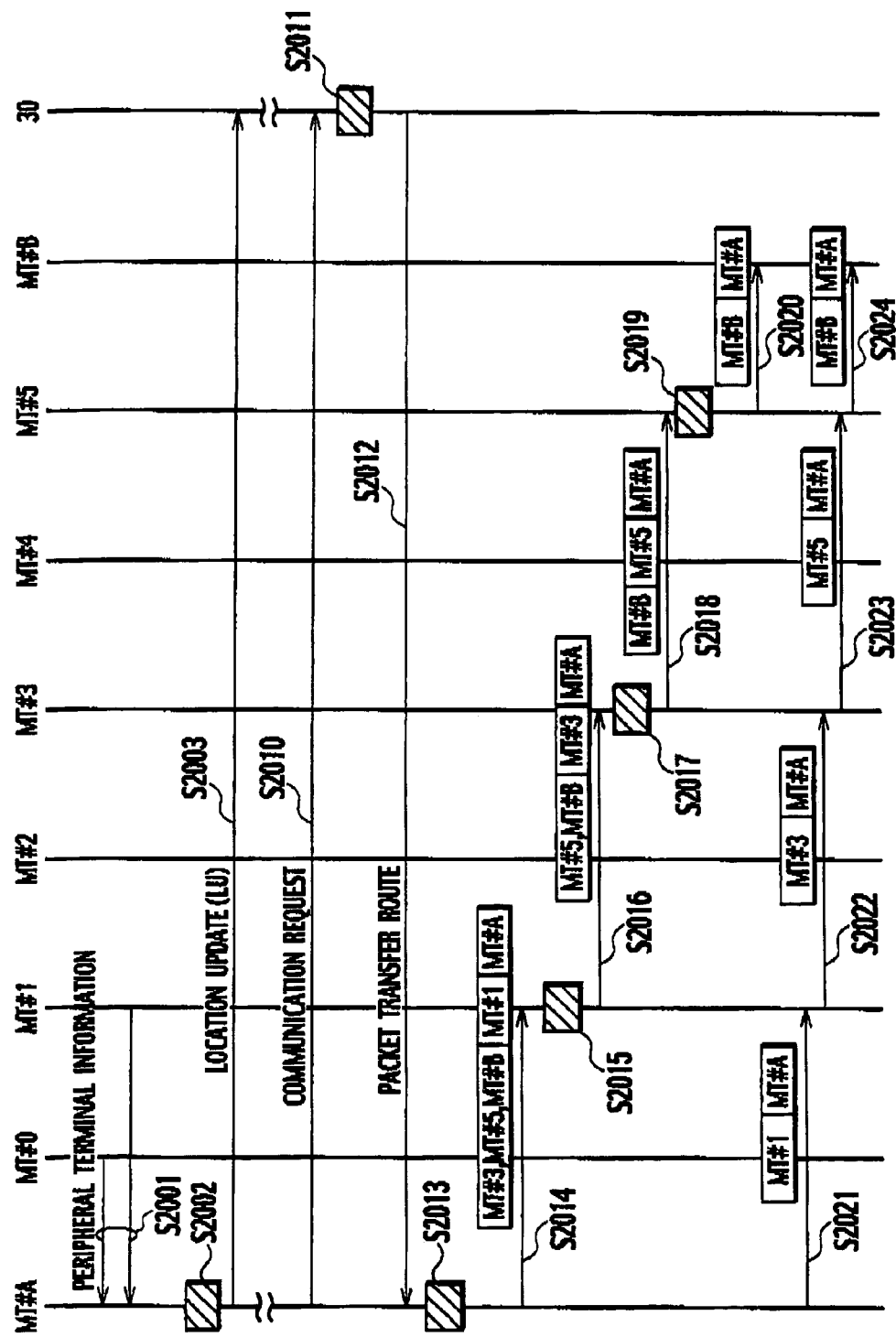
FIG. 7 is a sequence diagram showing a mobile communication method according to a first modification example of the present invention.

With reference to FIG. 7, a description will be given of a first modification example of the first embodiment of the present invention.

A mobile communication system according to the first modification example is the same as the mobile communication system according to the first embodiment of the present invention, except the method of transmitting the packet by the packet transmitter unit 18 of the mobile terminal MT #A.

A case where the amount of packets to be sent by the packet transmitter unit 18 of the mobile terminal MT #A is large is assumed for the mobile communication system according to this modification example.

As in the case of the "DSR", the packet transmitter unit 18 is configured that each relay mobile terminal MT is firstly caused to store the destination of the packet, by transmitting the packet to which the header where all the relay mobile terminals MT included on the packet transfer route are designated is added.

With reference to FIG. 7, a description will be given of operation in which the packet is transferred from the mobile terminal MT #A to the destination terminal MT #B in the mobile communication system according to this modification example.

The operation from Steps S2001 to S2013 is the same as those from Steps S1001 to S1013 shown in FIG. 5.

In Step S2014, the packet transmitter unit 18 of the mobile terminal MT #A transmits the packet to which the header where all the relay mobile terminals MT included on the packet transfer route are designated is added, to the relay mobile terminal MT #1 through the wireless LAN I/F 12.

In Step S2015, the relay mobile terminal MT #1 stores information that the packet from the mobile terminal MT #A to the destination terminal MT #B is required to be transferred to the relay mobile terminal MT #3.

Then, in Step S2016, the relay mobile terminal MT #1 transmits the received packet to the relay mobile terminal MT #3.

Here, the relay mobile terminal MT may be configured to delete itself from the relay mobile terminals designated in the header of the received packet.

In Step S2017, the relay mobile terminal MT #3 stores information that the packet from the mobile terminal MT #A to the destination terminal MT #B is required to be transferred to the relay mobile terminal MT #5.

Then, in Step S2018, the relay mobile terminal MT #3 transmits the received packet to the relay mobile terminal MT #5.

In Step S2019, the relay mobile terminal MT #5 stores information that the packet from the mobile terminal MT #A to the destination terminal MT #B is required to be transferred to the destination terminal MT #B.

Then, in Step S2020, the relay mobile terminal MT #5 transmits the received packet to the destination terminal MT #B.

Thereafter, in Step S2021, the packet transmitter unit 18 of the mobile terminal MT #A transmits the packet to the destination terminal MT #B, without a header where all the relay mobile terminals included on the packet transfer route are designated, to the relay mobile terminal MT #1 through the wireless LAN I/F 12, based on the packet transfer route maintained in the route maintaining unit 17.

This packet is transferred to the destination terminal MT #B based on the packet transfer destination stored in each relay mobile terminal in Steps S2022 to S2024.

Furthermore, the packet transmitter unit 18 of the mobile terminal MT #A may be configured to switch between the packet transmission method in the first embodiment and the packet transmission method in this modification example, according to the amount of packets to be sent.

(Second Embodiment of the Present Invention)

With reference to FIGS. 8 to 12, a description will be given of a mobile communication system according to a second embodiment of the present invention.

Regarding the mobile communication system according to the second embodiment of the present invention, a description will hereinafter be given mainly of different points from the mobile communication system according to the above-mentioned first embodiment.

Figure 8:
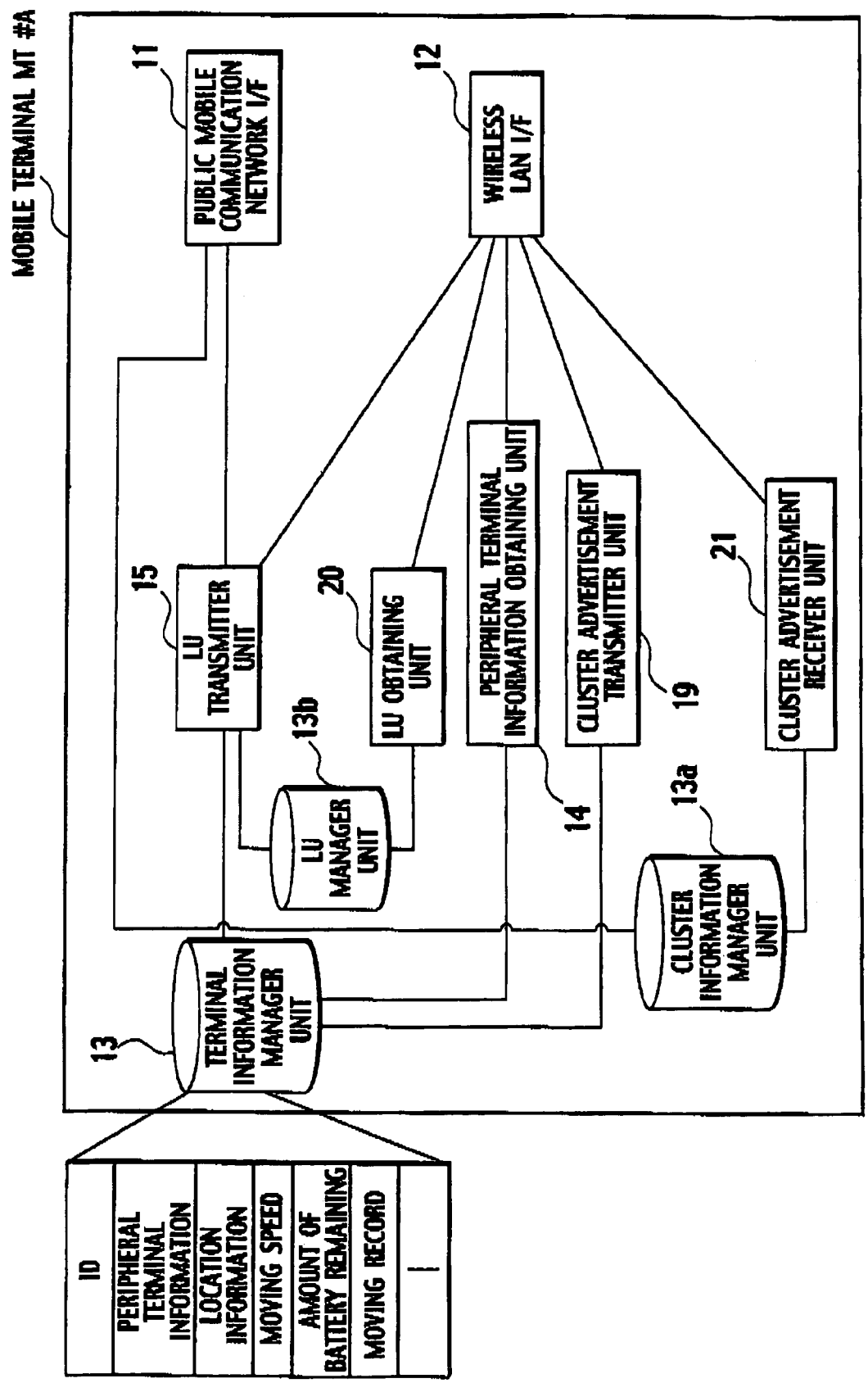
FIG. 8 is a functional block diagram of a mobile terminal according to the second embodiment of the present invention.

As shown in FIG. 8, the mobile terminal MT #A according to this embodiment includes a cluster information manager unit 13a, an LU manager unit 13b, a cluster advertisement transmitter unit 19, an LU obtaining unit 20 and a cluster advertisement receiver unit 21, in addition to the configuration of the mobile terminal MT #A according to the above-mentioned first embodiment.

The cluster information manager unit 13a is configured to manage information on which mobile terminal MT is a cluster.

For example, the cluster information manager unit 13a is configured to manage the information that the mobile terminal MT #A is the cluster, when the mobile terminal MT #A is determined to be the cluster (the representative terminal) by the control device 30 in the public land mobile network (that is, when receiving a cluster command from the control device 30).

Moreover, the cluster information manager unit 13a is configured to manage the cluster advertisements received from the mobile terminals MT existing around the mobile terminal MT #A.

The cluster advertisement transmitter unit 19 is configured to transmit the cluster advertisement including the identification information of the mobile terminal MT #A, a flag showing that the mobile terminal MT #A is the cluster and the number of the terminals to be managed by the mobile terminal MT #A (the cluster), to the mobile terminals MT existing around the mobile terminal MT #A, when detecting that the mobile terminal MT #A is the cluster (the representative terminal) with reference to the cluster information manager unit 13a.

The LU obtaining unit 20 is configured to collect a local location updates (local LUs) of the mobile terminals MT existing around the mobile terminal MT #A, when the mobile terminal MT #A is the cluster.

The cluster advertisement receiver unit 21 is configured to receive the cluster advertisement sent from the mobile terminal MT existing around the mobile terminal MT #A, and to store the received cluster advertisement in the cluster information manager unit 13a.

The LU transmitter unit 15 is configured to transmit the local LU obtained by the LU obtaining unit 20 together with the location update (LU) of the mobile terminal MT #A as a global location update (global LU) to the control device 30 through the public land mobile network I/F 11, when the mobile terminal MT #A is the cluster.

In addition, when the mobile terminal MT existing around the mobile terminal MT #A is detected to be the cluster with reference to the cluster information manager unit 13a, the LU transmitter unit 15 transmits the local LU to the mobile terminal MT (the cluster) through the wireless LAN I/F 12.

Note that the LU transmitter unit 15 may be configured to transmit the local LU through the wireless LAN I/F 12 to the mobile terminal MT (the cluster) having strong radio wave, the mobile terminal MT (the cluster) having the smallest number of terminals contained, or the mobile terminal (the cluster) from which the largest number of the cluster advertisements have been received within a predetermined period of time, when the plurality of cluster advertisements are stored in the cluster information manager unit 13a.

For example, firstly the LU transmitter unit 15 transmits the local LU to the mobile terminal MT (the cluster) having strong radio wave.

Secondly, when there exist the plurality of mobile terminals MT having the same level of the radio wave strength, the LU transmitter unit 15 transmits the local LU to the mobile terminal MT (the cluster) having the smallest number of the terminals contained among such mobile terminals MT.

Thirdly, when there exist the plurality of mobile terminals MT (the clusters) in which the number of the terminals contained is equal, the LU transmitter unit 15 transmits the local LU to the mobile terminal MT (the cluster) from which the largest number of the cluster advertisements have been within a predetermined period of time.

Figure 9:
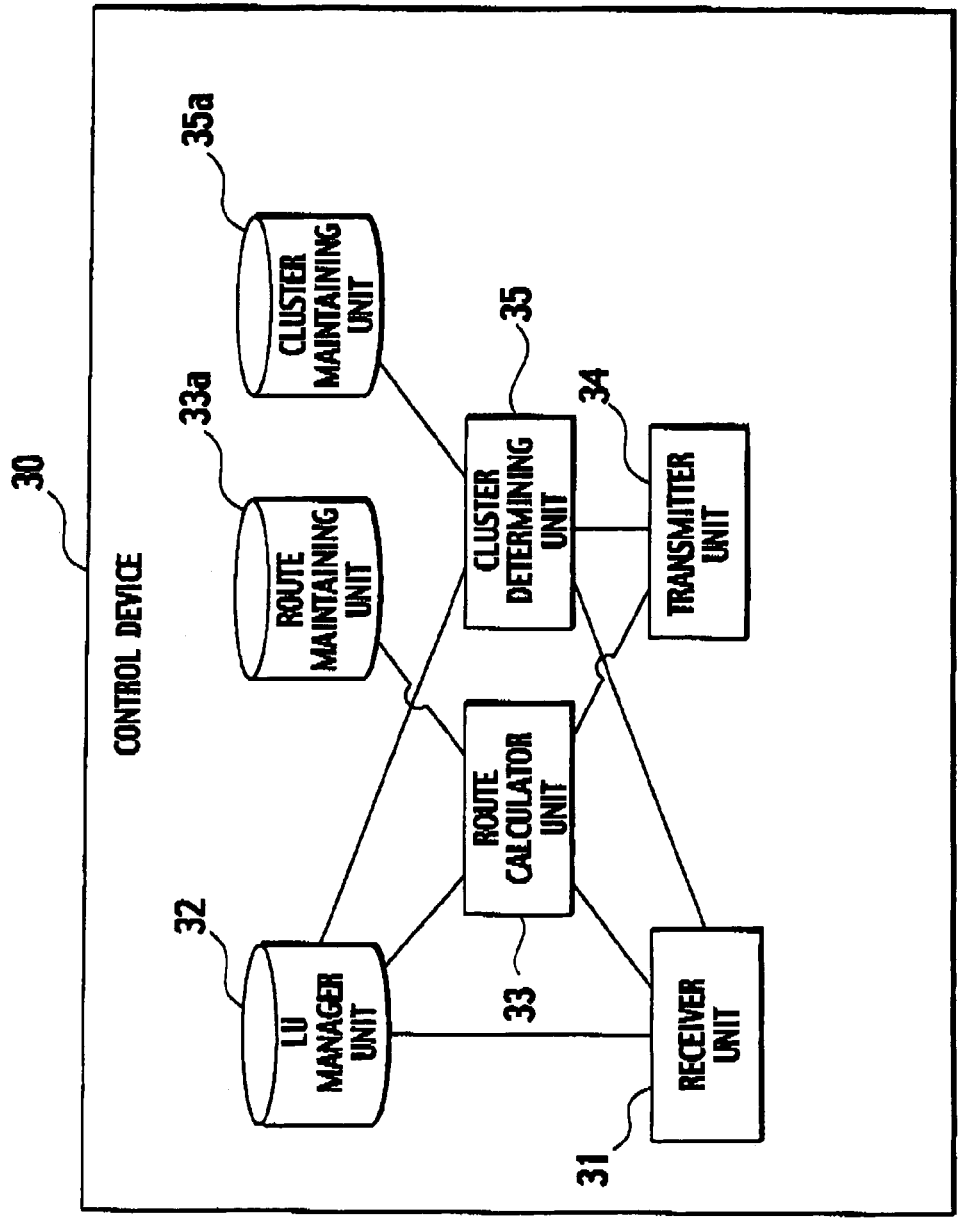
FIG. 9 is a functional block diagram of a control device according to the second embodiment of the present invention.

As shown in FIG. 9, the control device 30 according to this embodiment includes a class determining unit 35 and a cluster maintaining unit 35a, in addition to the configuration of the control device 30 according to the above-mentioned first embodiment.

A class determining unit 35 is configured to determine the cluster (the representative terminal) to transmit the location updates of the plurality of mobile terminals MT to the control device 30 as a representative, based on the location update managed by the LU manager unit 32.

Specifically, the class determining unit 35 is configured to select the cluster in a manner of making the number of clusters as small as possible in the whole mobile communication system.

The cluster maintaining unit 35a is configured to maintain the cluster determined by the class determining unit 35.

The transmitter unit 34 is configured to notify the mobile terminal to have been determined as the cluster of the cluster command to command the fact to that effect.

Figure 10:
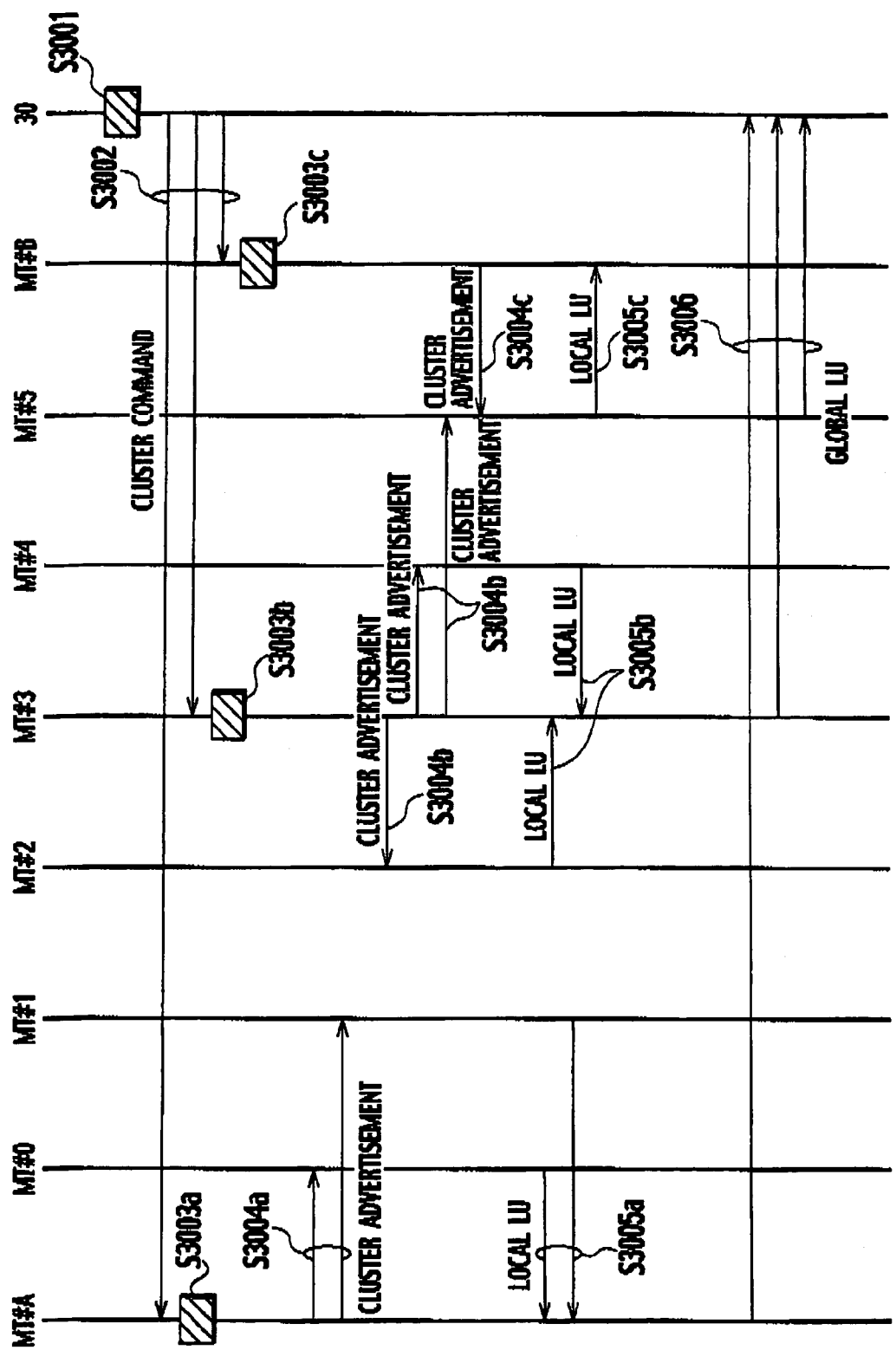
FIG. 10 is a sequence diagram showing a mobile communication method according to the second embodiment of the present invention.
Figure 11:
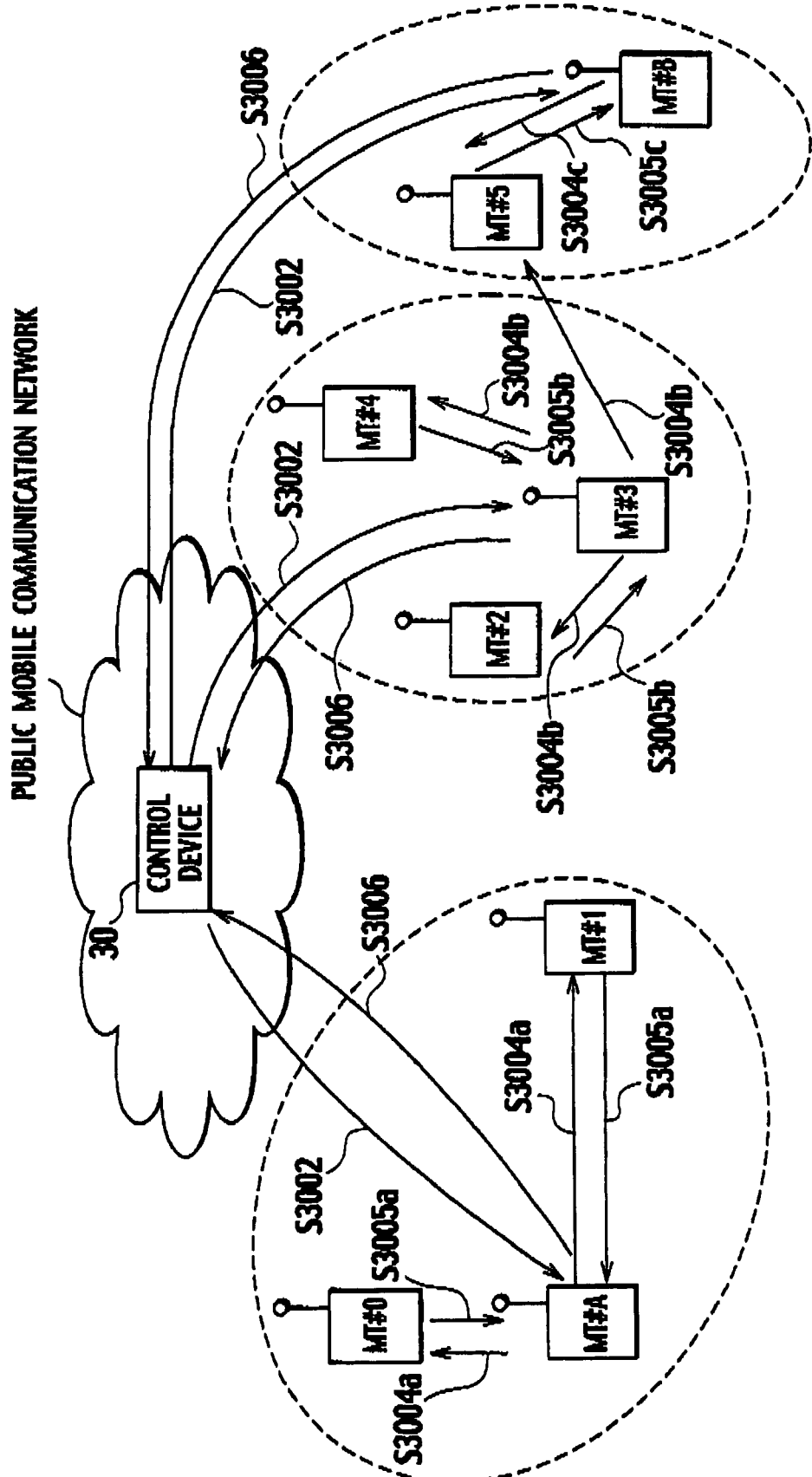
FIG. 11 is a view showing a flow of the mobile communication method according to the second embodiment of the present invention.

With reference to FIGS. 10 and 11, a description will be given of operation in which the plurality of mobile terminals MT transmit the global LUs to the control device 30 in the mobile communication system according to this embodiment.

As shown in FIGS. 10 and 11, in Step S3001, the class determining unit 35 of the control device 30 determines the clusters from the plurality of the mobile terminals MT. The mobile terminals MT #A, MT #3 and MT #B are determined as the clusters in this embodiment.

In Step S3002, the transmitter unit 34 of the control device 30 transmits the cluster commands to command to be the cluster, to the mobile terminals MT #A, MT #3 and MT #B.

In Step S3003a, the cluster information manager unit 13a of the mobile terminal MT #A stores information that the mobile terminal MT #A is the cluster.

In Step S3003b, the cluster information manager unit 13a of the mobile terminal MT #3 stores information that the mobile terminal MT #3 is the cluster.

In Step S3003c, the cluster information manager unit 13a of the mobile terminal MT #B stores information that the mobile terminal MT #B is the cluster.

In Step S3004a, the cluster advertisement transmitter unit 19 of the mobile terminal MT #A transmits the cluster advertisement for notifying that the mobile terminal MT #A is the cluster, to the mobile terminals MT #0 and MT #1 in the surroundings.

In Step S3004b, the cluster advertisement transmitter unit 19 of the mobile terminal MT #3 transmits the cluster advertisement for notifying that the mobile terminal MT #3 is the cluster, to the mobile terminals MT #2 to MT #4 in the surroundings.

In Step S3004c, the cluster advertisement transmitter unit 19 of the mobile terminal MT #B transmits the cluster advertisement for notifying that the mobile terminal MT #B is the cluster, to the mobile terminal MT #5 in the surroundings.

In Step S3005a, the LU transmitter units 15 of the mobile terminals MT #0 and MT #1 transmit the local LUs to the mobile terminal MT #A (the cluster).

In Step S3005b, the LU transmitter units 15 of the mobile terminals MT #2 and MT #4 transmit the local LUs to the mobile terminal MT #3 (the cluster).

In Step S3005c, the LU transmitter unit 15 of the mobile terminal MT #5 transmits the local LU to the mobile terminal MT #B (the cluster).

Here, although the mobile terminal MT #5 receives the cluster advertisements from both of the mobile terminals MT #3 and MT #B, the mobile terminal MT #5 determines to transmit the local LU to the mobile terminal MT #B, based on the above-mentioned determination method by the LU transmitter unit 15.

In Step S3006, each of the mobile terminals MT #A, MT #3 and MT #B to be the clusters transmits to the control device 30 the received local LU together with its own location update as the global LU.

With the mobile communication system according to this embodiment, the mobile terminal MT designated as the cluster transfers to the control device 30 the local LUs of the mobile terminals in the surroundings in an aggregated manner. Hence, it is possible to reduce the amount of traffic which flows into the public land mobile network.

Note that by using the mobile communication system according to this embodiment, even a mobile terminal MT which cannot make direct communication with the public land mobile network (for example, a mobile terminal existing out of coverage area such as in a tunnel or underground, or a mobile terminal without a public land mobile network I/F for performing communication with the public land mobile network) can deliver a location update (LU) to the control device 30 in the public land mobile network, if it is possible to perform communication with a mobile terminal designated as the cluster through the wireless LAN. Accordingly, it is possible to use this mobile terminal as a relay mobile terminal.

Figure 12:
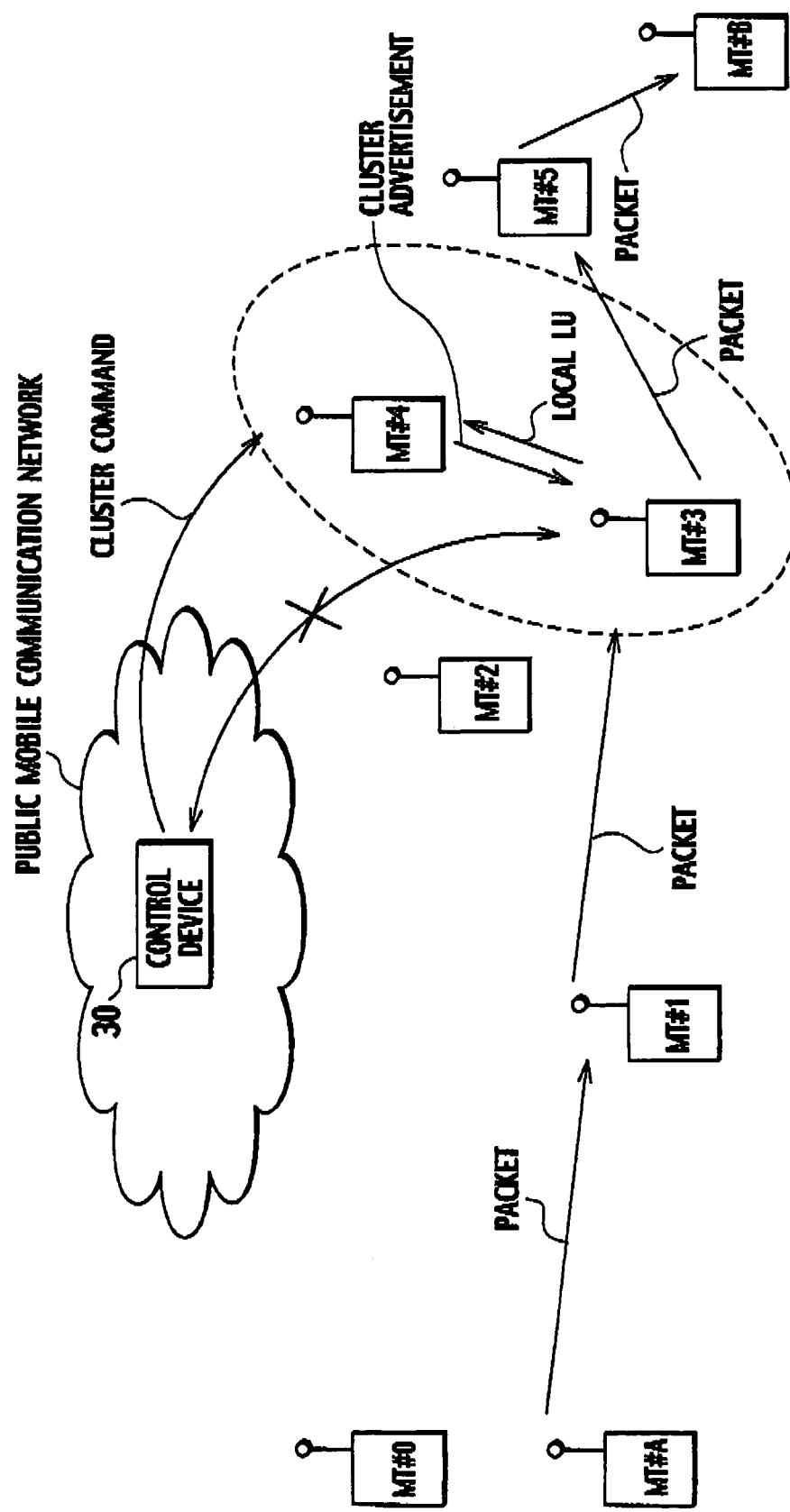
FIG. 12 is a view showing an application example of the mobile communication method according to the second embodiment of the present invention.

As shown in FIG. 12, when the relay mobile terminal MT #3 along the packet transfer route from the mobile terminal MT #A to the destination terminal MT #B cannot be found, the control device 30 transmits the cluster command to the mobile terminal MT #4 existing around the relay mobile terminal MT #3.

This enables the control device 30 to obtain the location update (LU) of the relay mobile terminal MT #3, to use the relay mobile terminal MT #3 as a relay mobile terminal along the packet transfer route from the mobile terminal MT #A to the destination terminal MT #B, and to increase connectability between mobile terminals.

(Third Embodiment of the Present Invention)

Figure 13:
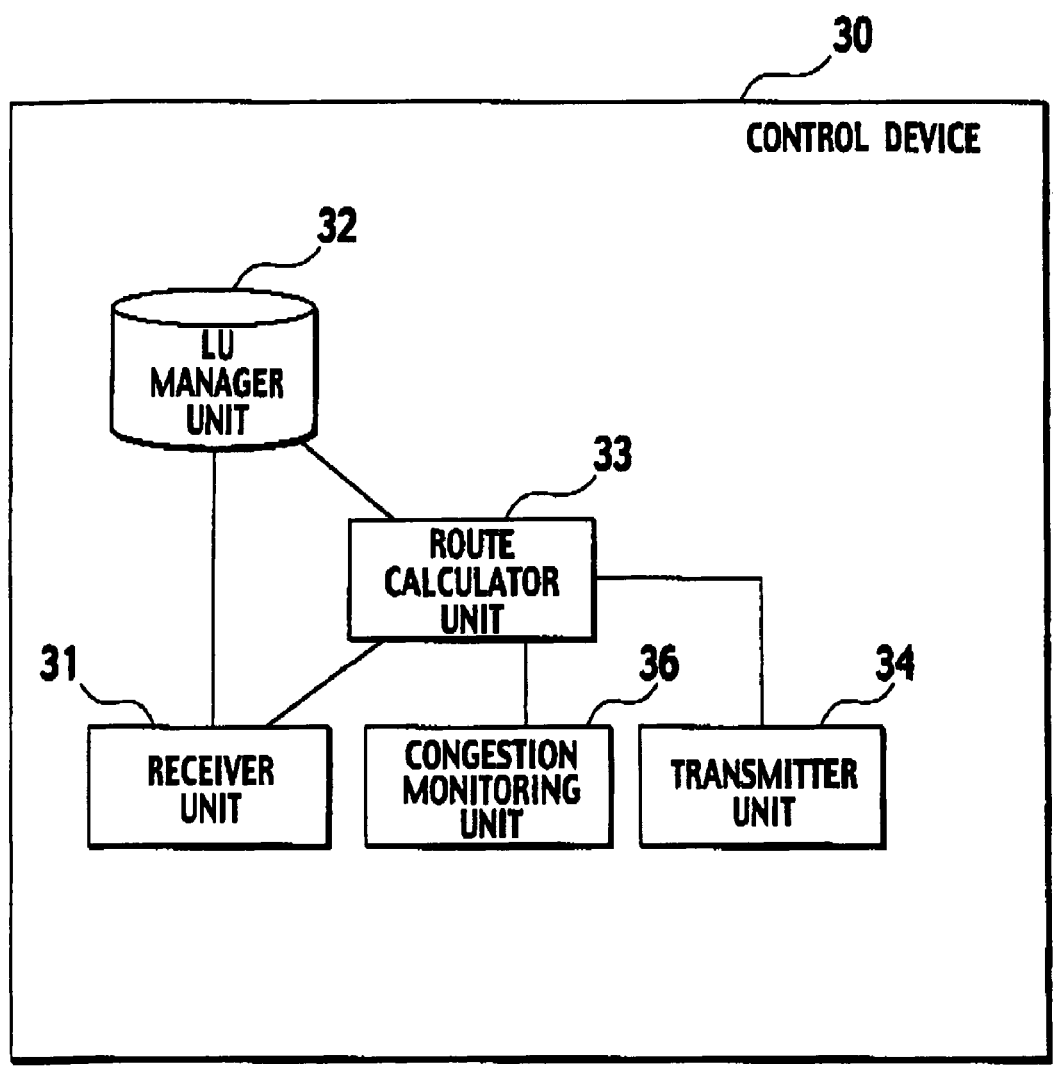
FIG. 13 is a functional block diagram of a control device according to the third embodiment of the present invention.
Figure 14:
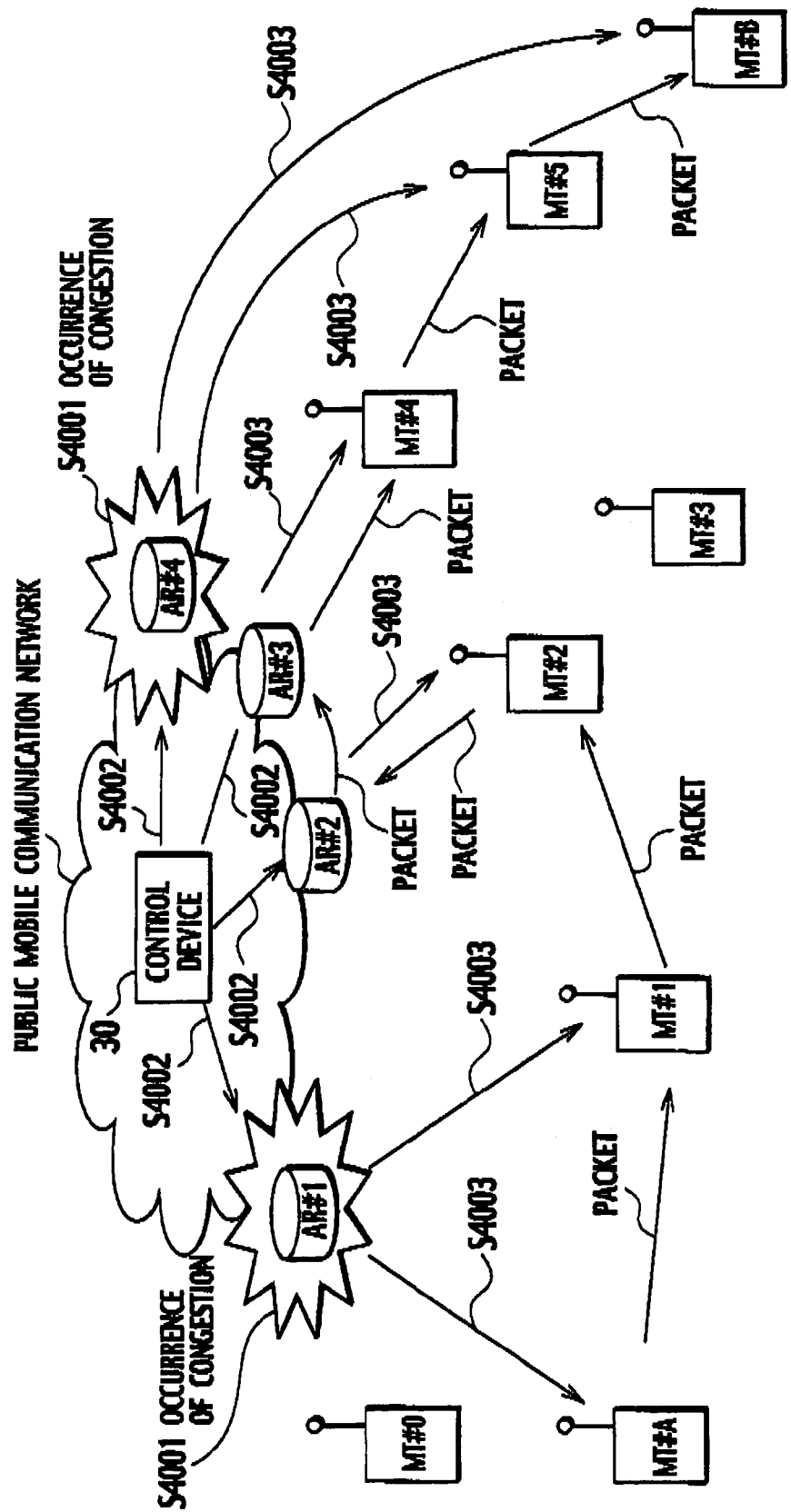
FIG. 14 is a view showing a flow of a mobile communication method according to the third embodiment of the present invention.

With reference to FIGS. 13 and 14, a description will be given of a mobile communication system according to a third embodiment of the present invention.

Hereinafter, regarding the mobile communication system according to the third embodiment of the present invention, a description will be given mainly of different points from the mobile communication system according to the above-mentioned first embodiment.

As shown in FIG. 13, a control device 30 according to this embodiment includes a congestion monitoring unit 36, in addition to the configuration of the control device 30 according to the above-mentioned first embodiment.

The congestion monitoring unit 36 is configured to monitor a congestion state (a failure state) of access nodes (an access router, a base station) provided in the public land mobile network.

The route calculator unit 33 is configured to change the packet transfer routes from the mobile terminal MT #A to the destination terminal MT #B, in order not to pass through an access node in which the congestion state (the failure state) has been detected by the congestion monitoring unit 36.

With reference to FIG. 14, a description will be given of operation in which the packet transfer routes from the mobile terminal MT #A to the destination terminal MT #B are changed in the mobile communication system according to this embodiment.

As shown in FIG. 14, in Step S4001, the congestion state arises in the access routers AR #1 and AR #4.

In Step S4002, the congestion monitoring unit 36 of the control device 30, which has detected such a congestion state, resets the packet transfer route regarding between the mobile terminal MT #A under the control of the access router AR #1 and the access router AR #2 and between the access router AR #3 and the mobile terminal MT #B under the control of the access router AR #4, for bypassing the congestion spots, which uses direct communication between the mobile terminals MT. Then, the reset packet transfer route is notified to the access routers AR #1 to AR #4.

In Step S4003, the access routers AR #1 to AR #4 notifies the mobile terminals MT #A, MT #1, MT #2, MT #4, MT #5 and MT #B of the reset packet transfer route.

Consequently, the packet which was being transferred along the route "from MT #A to MT #B through AR #1, AR #2, AR #3 and AR #4" is to be transferred along a route "from MT #A to MT #B through MT #1, MT #2, AR #2, AR #3, MT #4 and MT #5".

The mobile communication system according to this embodiment can realize an improvement in communication quality by reducing the number of the relay mobile terminals by use of the public land mobile network, when it is not possible to provide a desired communication quality since the number of the relay mobile terminals are too large on the selected packet transfer route in relation to applications whose requirements on the communication quality, such as a delay of voice communication and the like, are strict.

(Fourth Embodiment of the Present Invention)

Figure 15:
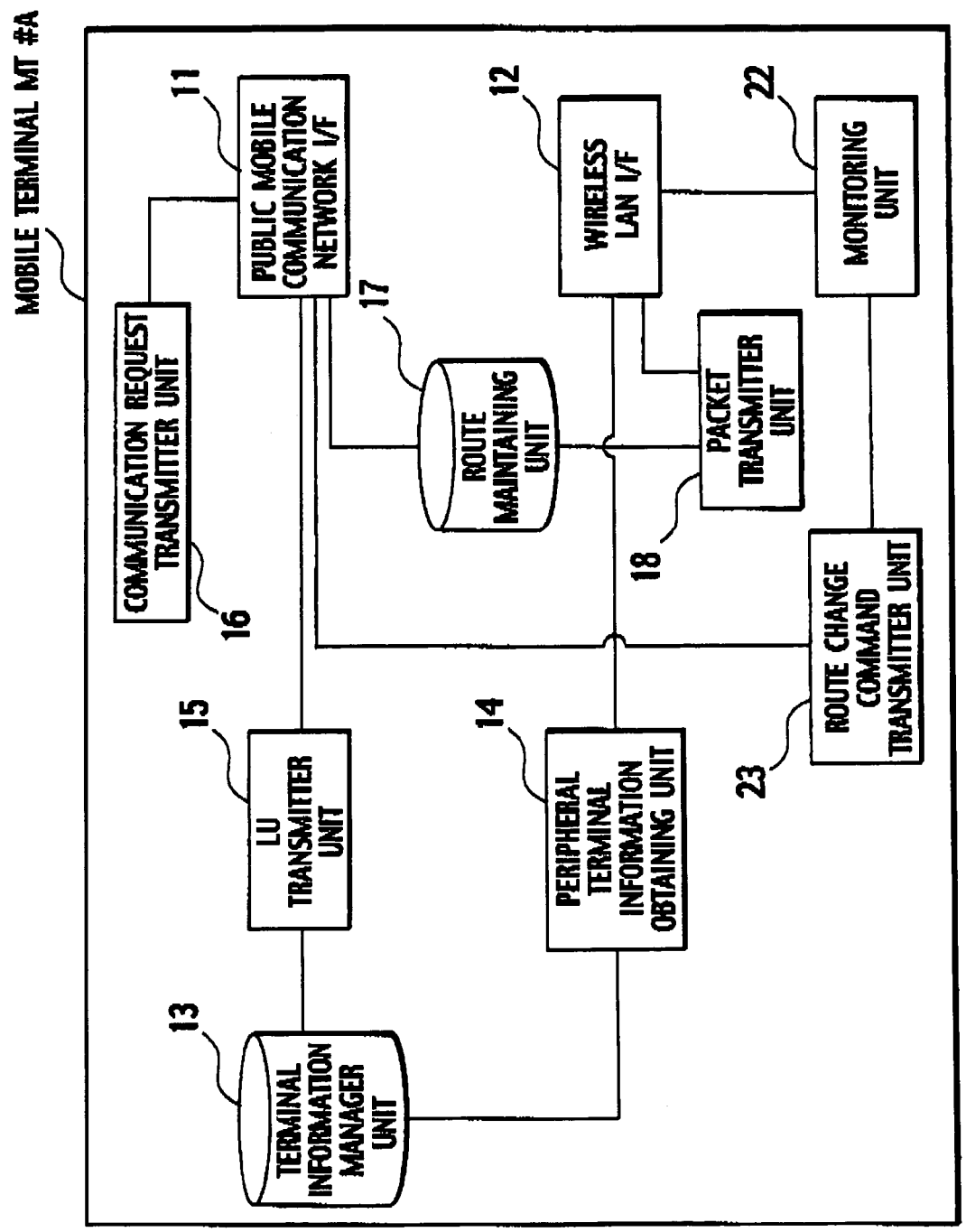
FIG. 15 is a functional block diagram of a mobile terminal according to the fourth embodiment of the present invention.
Figure 16:
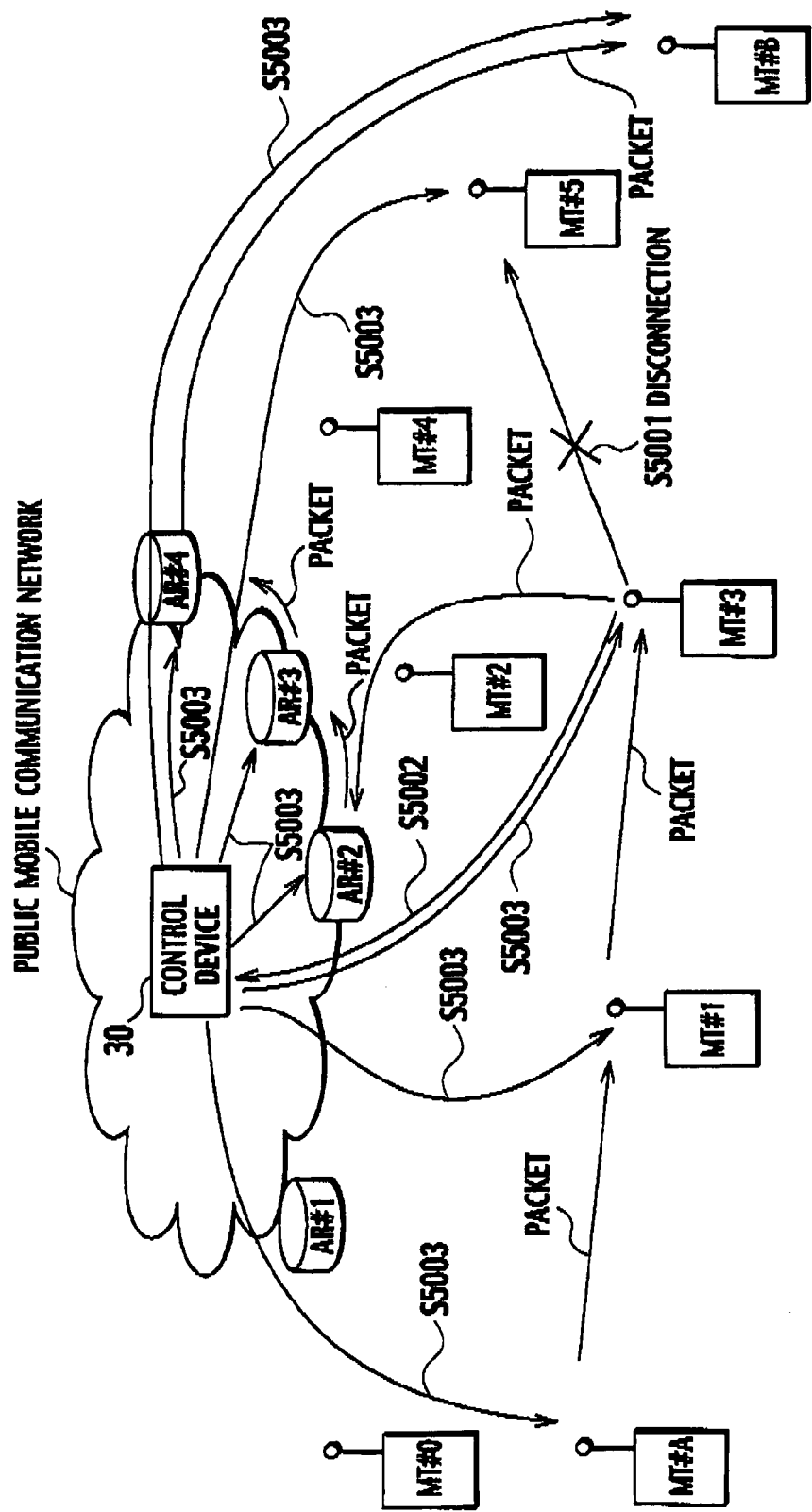
FIG. 16 is a view showing a flow of a mobile communication method according to the fourth embodiment of the present invention.

With reference to FIGS. 15 and 16, a description will be given of a mobile communication system according to a fourth embodiment of the present invention.

Hereinafter, regarding the mobile communication system according to the fourth embodiment of the present invention, a description will be given of different points from the mobile communication system according to the above-mentioned first embodiment.

As shown in FIG. 15, a mobile terminal MT #A according to this embodiment includes a monitoring unit, 22 and a route change command transmitter unit 23, in addition to the configuration of the mobile terminal MT #A according to the first embodiment.

The monitoring unit 22 is configured to monitor a state of a path established between the mobile terminal MT #A and another mobile terminal MT (a mobile terminal existing around the mobile terminal MT #A).

Moreover, the monitoring unit 22 is configured to monitor whether or not the packet sent through the wireless LAN I/F has arrived at the destination terminal MT or the relay mobile terminal MT.

Specifically, the monitoring unit 22 is configured to detect that the packet sent through the wireless LAN I/F does not arrive at the destination terminal MT or the relay mobile terminal. MT, by using timeout of a transmission control protocol (TCP: RFC793) or the like.

The route change command transmitter unit 23 is configured to transmit a route change command to command to change the packet transfer route from the mobile terminal MT #A to the destination terminal #B, to the control device 30 through the public land mobile network I/F, when a disconnection of a path established between the mobile terminal MT #A and another mobile terminal MT is detected, or when a fact that the packet does not arrive at the destination terminal MT or the relay mobile terminal within a predetermined period of time is detected.

Note that the packet transmitter unit 18 may be configured to improve a packet arrival rate by transmitting the packet through the public land mobile network I/F 11, in order to use the public land mobile network as a backup line, when the disconnection of the path established between the mobile terminal MT #A and another mobile terminal MT is detected, or when a fact that the packet does not arrive at the destination terminal MT or the relay mobile terminal MT within a predetermined period of time is detected.

Additionally, the route calculator unit 33 of the control device 30 is configured to examine the information maintained by the route maintaining unit 32 of each relay mobile terminal MT in response to the received route change command, and to identify the packet transfer route on which the failure is occurring, when the mobile terminal MT or the relay mobile terminal MT transmits the route change command in response to the detection of the disconnection of the path.

Note that the information maintained by the route maintaining unit 17 of each relay mobile terminal MT includes the sender's address, destination terminal's address and transfer source's address of the transferred packet.

Here, an IP address is used for the sender's address and the destination terminal's address, and an IP address or a MAC address is used for the transfer source's address.

In addition, in such a case, the IP address or the MAC address of each relay mobile terminal is assumed to be notified the control device 30 by the location update.

Then, after the packet transfer route on which the failure is occurring is identified, the route calculator unit 33 is configured to determine a packet transfer route with the lowest total cost as a new packet transfer route by calculation out of packet transfer routes which do not include the disconnected sections.

With reference to FIG. 16, a description will be given of operation in which the packet transfer route from the mobile terminal MT #A to the destination terminal MT #B is changed in the mobile communication system according to this embodiment.

As shown in FIG. 16, in Step S5001, the disconnection of a radio link occurs between the relay mobile terminals MT #3 and MT #5, which are parts of the packet transfer route from the mobile terminal MT #A to the destination terminal MT #B.

In Step S5002, the route change command transmitter unit 23 of the relay mobile terminal MT #3, which has detected this disconnection, transmits the route change command to the control device 30.

In Step S5003, the route calculator unit 33 of the control device 30 changes the packet transfer route from the mobile terminal MT #A to the destination terminal MT #B, and then notifies the changed packet transfer route to the access routers AR #2 to AR #4, the mobile terminals MT #A, MT #1, MT #3, MT #5 and MT #B.

As a result, the packet which was being transferred "from MT #A to MT #B through MT #1, MT #3 and MT #5" is to be transferred "from MT #A to MT #B through MT #1, MT #3, AR #2, AR #3 and AR #4".

According to this embodiment, not only when a failure such as the disconnection of a path is occurring, but also when the packet does not arrive at the destination terminal MT or the relay mobile terminal regardless of no occurrence of a failure such as one that a malicious relay mobile terminal MT stops transferring the packet, it is possible to change the packet transfer route.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile terminal comprising:
    a first wireless interface configured to perform communication through a public mobile communication network;
    a second wireless interface configured to perform direct communication with another mobile terminal;
    an update information transmitter unit configured to transmit update information including identification information and communication state information of the mobile terminal, to a control device in the public mobile communication network through the first wireless interface at a predetermined timing;
    a route maintaining unit configured to receive a packet transfer route generated by the control device of the public mobile communication network based on the update information through the first wireless interface, and to maintain the packet transfer route; and
    a packet transmitter unit configured to transmit a packet to another mobile terminal through the second wireless interface based on the packet transfer route, wherein
    the communication state information includes at least one of an amount of battery remaining in the mobile terminal, a moving speed of the mobile terminal, and a moving frequency of the mobile terminal, and
    the update information transmitter unit is configured to decrease the transmission frequency of the update information in any one of cases where the amount of battery remaining in the mobile terminal is equal to or less than a predetermined amount, where the moving speed of the mobile terminal is equal to or faster than a predetermined speed, and where the moving frequency of the mobile terminal is equal to or more than a predetermined frequency.

2. The mobile terminal according to claim 1, wherein the update information transmitter unit is configured to collect the update information of other mobile terminals, and to transmit the collected update information together with the update information of the mobile terminal to the control device of the public mobile communication network when the mobile terminal is determined to be a representative terminal by the control device in the public mobile communication network.

3. The mobile terminal according to claim 1, further comprising:
    a path state monitoring unit configured to monitor a state of a path established between the mobile terminal and the another mobile terminal, wherein
    the packet transmitter unit is configured to transmit the data packet to the public mobile communication network through the first wireless interface, when the path established between the mobile terminal and the another mobile terminal has been disconnected.

4. The mobile terminal according to claim 1, further comprising:
    an arrival monitoring unit configured to monitor whether or not the data packet transmitted through the second wireless interface arrives at any one of a destination terminal and a relay mobile terminal; and
    a route change command transmitter unit configured to transmit a route change command, to change the packet transfer route, to the control device in the public mobile communication network through the first wireless interface when the data packet is detected not to arrive at any one of the destination terminal and the relay mobile terminal within a predetermined period of time.

5. A control device provided in a public mobile communication network, comprising:
an update information manager unit configured to receive and manage update information including identification information and communication state information of a mobile terminal from the mobile terminal at a predetermined timing;
a route calculator unit configured to calculate an optimum packet transfer route out of a plurality of packet transfer routes from the mobile terminal to a destination terminal by calculating a total cost for each of the plurality of packet transfer routes based on the communication state information and determining a route with the lowest total cost as the optimum packet transfer route; and
a notification unit configured to notify the mobile terminal of the calculated optimum packet transfer route, wherein
the communication state information includes at least one of an amount of battery remaining in the mobile terminal, a moving speed of the mobile terminal, and a moving frequency of the mobile terminal.

6. The control device according to claim 5, further comprising:
a determining unit configured to determine a representative terminal which transmits the update information of the plurality of mobile terminals as a representative to the control device based on the communication state information; and
the notification unit further configured to notify the determined representative terminal of the designation as the representative terminal.

7. The control device according to claim 5, further comprising:
a congestion monitoring unit configured to monitor a congestion state of an access node provided in the public mobile communication network, wherein
the route calculator unit is configured to change the packet transfer route from the mobile terminal to the destination terminal, so as not to pass through the access node in which the congestion state has been detected.

8. The control device according to claim 5, wherein the route calculator unit is configured to change the packet transfer route from the mobile terminal to the destination terminal, when being notified by the mobile terminal that a path established between the mobile terminal and another mobile terminal has been disconnected.

9. The control device according to claim 5, wherein the route calculator unit is configured to change the packet transfer route from the mobile terminal to the destination terminal, when being notified by the mobile terminal that a packet has not arrived at any one of the destination terminal and a relay mobile terminal within a predetermined period of time.

10. The control device according to claim 5, wherein a cost required to transfer a packet to each mobile terminal in a packet transfer route is associated with the amount of battery remaining in the mobile terminal, the moving speed of the mobile terminal, or the moving frequency of the mobile terminal, and
the route calculator unit is further configured to calculate the total cost for each of the plurality of packet transfer routes by accumulating each of the costs to transfer the packet to each mobile terminal in each of the plurality of packet transfer routes, respectively.

11. The control device according to claim 10,
wherein the cost associated with the amount of battery remaining in the mobile terminal is set higher as the amount of battery remaining in the mobile terminal becomes smaller,
the cost associated with the moving speed of the mobile terminal is set higher as the moving speed of the mobile terminal becomes faster, and
the moving frequency of the mobile terminal is set higher as the moving frequency of the mobile terminal becomes higher.

12. A mobile communication method comprising:
transmitting, at a mobile terminal, an update information including identification information and communication state information of the mobile terminal, to a control device in a public mobile communication network through a first wireless interface at a predetermined timing;
calculating, at the control device, an optimum packet transfer route out of a plurality of packet transfer routes from the mobile terminal to a destination terminal by calculating a total cost for each of the plurality of packet transfer routes based on the communication state information included in the received update information and determining a route with the lowest total cost as the optimum packet transfer route;
notifying, at the control device, the mobile terminal of the calculated optimum packet transfer route; and
transmitting, at the mobile terminal, a packet to another mobile terminal through a second wireless interface based on the optimum packet transfer route, wherein
the communication state information includes at least one of an amount of battery remaining in the mobile terminal, a moving speed of the mobile terminal, and a moving frequency of the mobile terminal, and
a transmission frequency of the update information is decreased in any of one cases where the amount of battery remaining in the mobile terminal is equal to or less than a predetermined amount, where the moving speed of the mobile terminal is equal to or faster than a predetermined speed, and where the moving frequency of the mobile terminal is equal to or more than a predetermined frequency.

13. The mobile communication method according to claim 12, further comprising:
determining, at the control device, a representative terminal which transmits the update information of the plurality of mobile terminals as a representative to the control device based on the communication state information; notifying, from the control device, the determined representative terminal of the designation as the representative terminal; and
collecting, at the mobile terminal designated as the representative terminal, the update information of other mobile terminals, and transmitting, at the mobile terminal, the collected update information together with the update information of the mobile terminal, to the control device.

14. The mobile communication method according to claim 12, further comprising:
monitoring, at the control device, a congestion state of an access node provided in the public mobile communication network; and
changing, at the control device, the packet transfer route from the mobile terminal to the destination route, so as not to pass through the access node in which the congestion state has been detected.

* * * * *